United States Patent
Ott

(10) Patent No.: US 9,583,011 B2
(45) Date of Patent: Feb. 28, 2017

(54) AIRCRAFT SYSTEM FOR SIGNALING THE PRESENCE OF AN OBSTACLE, AN AIRCRAFT EQUIPPED WITH THIS SYSTEM, AND METHOD FOR THE DETECTION OF AN OBSTACLE

(71) Applicant: AIRBUS HELICOPTERS, Marignane (FR)

(72) Inventor: Adrien Ott, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 36 days.

(21) Appl. No.: 14/607,224

(22) Filed: Jan. 28, 2015

(65) Prior Publication Data

US 2016/0217696 A1    Jul. 28, 2016

(51) Int. Cl.
G08G 5/04        (2006.01)
G08G 5/00        (2006.01)
G01C 21/00       (2006.01)

(52) U.S. Cl.
CPC ......... G08G 5/0086 (2013.01); G01C 21/005 (2013.01); G08G 5/0013 (2013.01); G08G 5/0021 (2013.01); G08G 5/045 (2013.01)

(58) Field of Classification Search
CPC ...... G08G 5/04; G08G 5/0013; G08G 5/0021; G08G 5/0086; G08G 5/0073; G08G 5/0078
USPC ................................ 701/532, 409, 450, 454
See application file for complete search history.

(56) References Cited

U.S. PATENT DOCUMENTS

| 6,101,431 | A  | * | 8/2000  | Niwa ..................... G01C 11/00 340/980 |
| 6,219,618 | B1 | * | 4/2001  | Bateman ................ G01O 5/005 244/158.1 |
| 6,438,492 | B1 |   | 8/2002  | Le Tallec et al. |
| 7,633,430 | B1 |   | 12/2009 | Wichgers et al. |
| 7,994,902 | B2 |   | 8/2011  | Avery et al. |
| 8,019,529 | B1 | * | 9/2011  | Sharma ................... G08G 5/06 701/117 |
| 8,046,165 | B2 |   | 10/2011 | Sacle et al. |
| 8,244,424 | B2 |   | 8/2012  | Subelet et al. |

(Continued)

FOREIGN PATENT DOCUMENTS

| EP | 0911647 A2 | 4/1999 |
| EP | 0911647 A3 | 1/2003 |

(Continued)

OTHER PUBLICATIONS

Federal Aviation Administration database of Terrain and Obstacles, Aug. 12, 2014, AgriData Inc. Docs.*

(Continued)

*Primary Examiner* — Thomas G Black
*Assistant Examiner* — Sara Lewandroski
(74) *Attorney, Agent, or Firm* — Brooks Kushman P.C.

(57) ABSTRACT

A system of an aircraft for signaling the presence of an obstacle during visual flight, which system includes at least one onboard unit to be installed in an aircraft to be equipped, which onboard unit includes an onboard database that stores at least one obstacle to be avoided during flight. The onboard unit includes an interface to be installed in the aircraft and whose function is to authorize the addition and the deletion of obstacles in the onboard database, with the interface being in communication with the onboard database.

21 Claims, 2 Drawing Sheets

(56) References Cited

U.S. PATENT DOCUMENTS

| | | | |
|---|---|---|---|
| 8,566,018 B2 | 10/2013 | Filias | |
| 8,773,299 B1* | 7/2014 | Woodell | G08G 5/0086 340/945 |
| 8,862,381 B1* | 10/2014 | Ridl | G08G 5/045 701/3 |
| 2005/0109872 A1* | 5/2005 | Voos | G08G 5/0013 244/3.17 |
| 2008/0077695 A1* | 3/2008 | Schmidt | H04L 63/0263 709/228 |
| 2008/0109160 A1* | 5/2008 | Sacle | G08G 5/065 701/33.4 |
| 2009/0082954 A1 | 3/2009 | Ridenour, II | |
| 2009/0125745 A1* | 5/2009 | Hyatt | G08B 23/00 713/340 |
| 2011/0225212 A1* | 9/2011 | Pire | G08G 5/0086 707/812 |
| 2012/0072105 A1* | 3/2012 | Feyereisen | G01C 21/00 701/409 |
| 2012/0237083 A1* | 9/2012 | Lange | G06K 9/00805 382/103 |
| 2013/0120164 A1* | 5/2013 | Greene | G08G 5/0086 340/946 |
| 2013/0169541 A1 | 7/2013 | Cabos et al. | |
| 2013/0321176 A1* | 12/2013 | Vasek | G08G 5/04 340/945 |
| 2015/0019862 A1* | 1/2015 | Uczekaj | H04L 67/12 713/155 |
| 2015/0271391 A1* | 9/2015 | Lehmann | H04N 5/23222 348/231.6 |

FOREIGN PATENT DOCUMENTS

| | | |
|---|---|---|
| EP | 2204639 | 7/2010 |
| EP | 2355071 | 8/2011 |
| EP | 2407953 | 1/2012 |
| FR | 2780701 | 1/2000 |
| FR | 2893158 | 5/2007 |
| FR | 2908218 | 5/2008 |

OTHER PUBLICATIONS

French Search Report for French Application No. 1302806, Completed by the French Patent Office on May 20, 2014, 11 Pages.

* cited by examiner

AIRCRAFT SYSTEM FOR SIGNALING THE PRESENCE OF AN OBSTACLE, AN AIRCRAFT EQUIPPED WITH THIS SYSTEM, AND METHOD FOR THE DETECTION OF AN OBSTACLE

BACKGROUND OF THE INVENTION (1) Field of the Invention

The present invention relates to a system for indicating the presence of an obstacle, an aircraft equipped with this system, and an obstacle-avoidance procedure.

Thus, the invention lies within the technical area of obstacle detection on board an aircraft.

(2) Description of Related Art

The simplest and the most free manner of flying consists of piloting an aircraft by observing the outside environment in order to guide this aircraft and, if necessary, to avoid obstacles. The phrase "visual flight" characterizes this type of flying.

Visual flight is traditionally authorized under certain visibility and cloud-cover conditions. Such visual flight is governed by rules that are known by the abbreviation "VFR" (Visual Flight Rules).

During visual flight, however, a pilot may not see an obstacle, or may not see it early enough to avoid a collision, which could lead to an incident. These obstacles may include, in particular, electrical power-line pylons, antennas, cables such as electrical power lines, antenna guy wires, or even towing cables.

Poor awareness by the pilot of the presence of these obstacles is a recurring factor in accidents during visual flight.

Systems for determining the presence of obstacles are known. However, these systems may be considered costly, and therefore are not installed on board aircraft intended for visual flights. In fact, the instrumentation that is present on board such aircraft may be reduced in order to reduce the cost of the aircraft, which does not appear to be compatible with the installation of costly instruments for signaling obstacles.

Conversely, aircraft are instrumented in order to allow flight known as "instrument flight" In compliance with rules that are known by the abbreviation "IFR" (Instrument Flight Rules).

A pilot performs an instrument flight in compliance with these IFR rules with the aid of instruments and, optionally, with the aid of an airborne control center, in order to:

keep his aircraft in a proper flight configuration, in terms of altitude and speed;

follow a path imposed by the air traffic organizations; and comply with the published regulations and procedures.

An aircraft may be equipped with a system known by the acronym "TAWS" (Terrain Awareness and Warning System). The versions of TAWS systems that are dedicated specifically to being carried on board rotary-wing aircraft are sometimes known as "HTAWS".

This TAWS system is used, in particular, within the context of instrument flights.

A TAWS system can allow a predictive operating mode based on the use of a database of terrain and of obstacles, if any. The system determines the presence of an obstacle by using this database and, if necessary, signals an obstacle to a pilot.

The term "terrain" is understood as referring to the surface of the planet. The preparation of a terrain database may cause certain obstacles that are present on the surface of the planet to be likened to terrain, such that these obstacles are not treated as obstacles but as terrain.

Accordingly, the term "obstacle" is understood as referring to an object that is located on the surface of the planet but that is not identified as constituting a part of this surface.

A TAWS system may, if appropriate, provide a reactive operating mode using sensors on board the aircraft to probe the outside environment and detect a potential obstacle. The detection of an obstacle leads to the triggering of a warning intended for a pilot. These sensors may include a variometer, a radio altimeter, or even a piece of equipment known in English as "glide slope".

Thus, TAWS systems are designed primarily for use during IFR (i.e., instrument) flight. The function of a TAWS system is to warn the pilot of an estimated collision risk, based on relatively short notice. Accordingly, the goal of the TAWS system is not to provide long-term anticipation helping a pilot to acquire and maintain, during visual flight, visual contact with the potentially most dangerous obstacle.

The terrain and obstacle database is sometimes divided into a terrain database that provides topographic information and an obstacle database that lists potential obstacles.

The obstacle database or databases that are used in TAWS systems are subject to quality requirements and an expensive trackability process, particularly in view of their use during IFR (instrument) flight. They are then updated by competent organizations.

Furthermore, aircraft are sometimes equipped with an active detection system known by the abbreviation "OWS" (Obstacle Warning System). An OWS system may be based on the use of a probe device that probes the sector of the outside environment located in front of the aircraft. This probe device may include a radar, a so-called "scanning" laser, or a laser-based remote detection system known by the acronym "LIDAR" ("Light Detection and Ranging") that employs a laser light. The echoes generated by the probe device could possibly permit reconstitution of the obstacles that are located in the detection zone.

Consequently, TAWS and OWS systems have the disadvantage of being expensive, because of the devices and/or the databases to be implemented. These TAWS and OWS systems may therefore be difficult to implement on board an aircraft intended for visual flight.

Furthermore, and in order to combat wire-based obstacles of the cable type, a rotary-wing aircraft may be equipped with one or more cable cutters.

Cable cutters are worthwhile and inexpensive passive solutions for preventing an accident following a collision with a cable. However, cable cutters are not effective against all types of obstacles, such as, for example, a crane.

Map-display systems only make it possible to view the position of topographic elements and of obstacles in relation to the position and orientation of the aircraft.

These map systems do not always necessarily include warning means for signaling an obstacle, and require an analysis of the display that can take the pilot several seconds to perform.

Document FR 2,780,701 proposes the inclusion of measurements of the instantaneous position and speed of an aircraft in messages that are broadcast via radio. A device installed on board a given aircraft flying VFR analyzes the messages that are broadcast via radio and the path being followed by this given aircraft in order to identify a collision risk. A potential collision risk is signaled vocally.

Document FR 2,893,158 describes a procedure for the construction of a database of obstacles that includes topographic information about obstacles based on heterogeneous sources. Among these sources, document FR 2,893,158 cites commercial databases that include topographic data about obstacles, or even information from various organizations that are responsible for compiling the obstacles.

Document U.S. Pat. No. 7,994,902 B2 proposes an anti-collision system in which vehicles on the ground send and receive GPS information for anti-collision purposes.

Documents EP2355071, EP 2407953, FR 2,908,218, EP 0911647, EP 2204639, U.S. Pat. No. 7,633,430, US 2009/082954, and US 2013/169541 are also known.

Thus, the goal of the present invention is to propose an innovative and, if possible, inexpensive system for indicating the presence of an obstacle in an aircraft and, possibly, in an aircraft engaging in visual flights.

BRIEF SUMMARY OF THE INVENTION

According to the invention, an aircraft system for signaling the presence of an obstacle during a visual flight with an aircraft includes at least one onboard unit to be installed on board this aircraft to be equipped, with this onboard unit including an onboard database that stores at least one obstacle to be avoided during flight.

The onboard unit includes an interface to be installed in an aircraft and whose function is to authorize the addition and the deletion of obstacles in the onboard database, with this interface being in communication with the onboard database.

Within the context of a visual flight, the onboard database is not subject to the requirements that are applicable to an obstacle database that is used during an instrument flight, for example, by a TAWS system. In fact, a visual flight does not require the presence of an obstacle-detection system.

Accordingly, the invention proposes an obstacle-detection system for improving safety during a visual flight that may be inexpensive because it is not linked to constraining requirements.

In order to meet limited cost goals, this system is based, in particular, on the use of an onboard database.

The updating of a database by certified agencies may be expensive. However, the invention proposes the implementation of an onboard database that is updated during flight, for example, by a pilot. This manual updating reduces the cost of the system and makes it possible to supplement or to correct the onboard database.

In fact, the interface allows a crew to interact with the system, by giving the crew the option of supplementing the onboard database.

Advantageously, a crew may focus on the obstacles that usually are not stored in the usual obstacle databases. In particular, a crew may store, in the onboard database, temporary obstacles such as mobile cranes, hoisting cables, antennas and their guy wires, or even obstacles under construction, such as towers. This information is a supplement to the fixed or frozen database, which may store known obstacles.

Insofar as the system is based on information contained in the onboard database in order to draw the pilot's attention to an obstacle, the invention proposes means for improving the quality of the onboard database.

For example, the interface allows a pilot to mark the current position of the aircraft when it is near an obstacle that was not indicated by the system, in order to store this obstacle in the onboard database. This step makes it possible to expand the completeness of the database. In a similar way, the invention allows the pilot to delete an improperly signaled obstacle.

The information entered by a crew during flight may be analyzed on the ground, for example, by cross-checking the entered information against an aeronautical chart or a satellite image, in order to specify the coordinates of an obstacle. This step makes it possible to enhance the integrity of the onboard database. On the ground, for example, the operator may confirm the deletion of an obstacle, or may modify the coordinates of an obstacle that was added during flight, in order to improve the accuracy of the onboard database. For example, these confirmation operations are performed with the aid of the onboard system.

The system offers a solution that may be inexpensive and that can easily be integrated into an aircraft in order to assist a pilot during a visual flight by storing obstacles in a database that can easily be updated. The onboard database may be collaborative, through the sharing of data among several users, which makes it possible to expand its completeness.

Thus, it will be understood that, when in proximity to an obstacle, the system may signal the obstacle to the crew in order to draw the visual attention of the crew members to the potentially most dangerous obstacle.

Thus, the system helps the pilot to acquire visual contact with the potentially most dangerous element. Accordingly, the system helps the pilot to keep the obstacle in his visual field, optionally through the use of synthesized positioning information for this obstacle. The system also helps the pilot to adjust his flight path, if necessary.

The system may also include one or more of the characteristics described below.

Thus, the onboard database may include a frozen database that cannot be modified by the interface during flight and an adaptive database that can be modified by the interface.

The frozen database may, if necessary, be updated on an ad hoc basis, while the adaptive database may be updated during flight, for example, by a pilot.

Thus, the system has two databases, namely, a so-called "frozen" database that is updated on an a priori basis by the authorities or by a qualified company, and an adaptive database that is updated, in particular, during flight.

The obstacles that are added or deleted in the adaptive database during flight may be limited to occasional or temporary obstacles, such as mobile obstacles (cranes, antennas, and towing cables), or obstacles that have not been stored (such as antennas and their guy wires, towers under construction, etc.).

Furthermore, the onboard database includes, for example, a terrain database and/or an obstacle database.

According to the foregoing variant, the frozen database may include a terrain database and/or an obstacle database.

Furthermore, the onboard unit may optionally include a processing unit that communicates with the onboard database and also a signaling unit that communicates with the processing unit and a positioning unit that communicates with the processing unit, with the positioning unit having the function of determining the position in space of the aircraft equipped with the system according to the invention, and with the signaling unit having the function of signaling an obstacle when the processing unit determines the proximity to the aircraft of an obstacle listed in the onboard database.

Accordingly, the system makes it possible to store obstacles in the onboard database and, with the aid of the positioning unit, to determine whether the aircraft is approaching such an obstacle.

If appropriate, synthesized information signaling the proximity of an obstacle is provided to a crew by the signaling unit. For example, the signaling unit provides a visual indication of the location of the most dangerous obstacle located in or near the primary visual field of the pilot in the cockpit, or oral messages describing the relative position of the obstacle in relation to the aircraft. A message such as "Obstacle at two o'clock low" may be generated.

The system is then equipped with a positioning unit. This positioning unit includes, for example, a positioning module known by the abbreviation "GPS" (Global Positioning System), or any other device that makes it possible to position an aircraft in space.

The system is also equipped with a processing unit that communicates with a positioning unit and with the onboard database.

The processing unit may include, for example, non-volatile memory and calculation means performing instructions stored in the non-volatile memory, such as a processor. Any device may be used that allows a set of operations to be performed. Thus, the processing unit has the function of determining the position of the stored obstacles in relation to the aircraft and its path, and of estimating their level of danger, by taking into consideration the position of the path of the aircraft in order to determine the most dangerous obstacle.

Furthermore, this processing unit communicates with the signaling unit via standard connection means.

The processing unit then informs the signaling unit of the presence of a potentially dangerous obstacle located within the visual field of the pilot during a visual flight, so that this signaling unit can inform the pilot of the obstacle.

This signaling unit may then include visual warning means and/or audible warning means.

The information provided to a pilot is then transmitted either exclusively orally, exclusively visually, or both orally and visually.

The visual warning means may include a dedicated display screen or a display screen that is not dedicated to this application. The audible warning means may optionally include an onboard telephone.

For example, the signaling unit includes a display that can receive and process the display requests from the processing unit, and a connection to the onboard telephone for the oral indications.

This display may be physically combined with the user interface. The display may then include a screen and a series of means, constituting the interface that can be maneuvered by a pilot. Interface buttons may then be located at the edge of the screen.

The screen may show a graphic representation giving the location of the most dangerous obstacle in relation to the orientation of the aircraft, and a site indication.

The onboard unit may also include a calculator, with this calculator combining, in a single body, the processing unit and the onboard database, with the calculator being connected to the positioning means and to the interface and to the signaling means.

The calculator is a component that is either dedicated or not dedicated to this application. The calculator may include storage means that store the onboard database and instructions that allow calculation means within the calculator to update the onboard database in response to a command from the system interface via a wired or wireless connection, and to transmit signaling orders to the signaling unit via a wired or wireless connection.

The calculator may be a stationary calculator or a mobile calculator known, for example, as a "tablet" or as a "smartphone".

The calculator may also be incorporated into a piece of equipment known as a "smart display", or into part of a modular avionics installation.

Alternatively, an onboard unit may include a piece of mobile equipment that contains, in a single body, the processing unit as well as the onboard database, the interface, and the signaling unit, with the mobile equipment being connected to the positioning means.

For example, the piece of mobile equipment is a tablet that includes memory that stores the database and instructions that can be executed by calculation means such as a processor. The tablet is also equipped with a screen and with means for connecting to the positioning unit and, if applicable, to an onboard telephone.

The processing unit and the interface and the signaling unit may include separate instruction segments, respectively. Thus, an instructions segment may require the display of a window on the display screen in order to create interface buttons, for example. These segments may, for example, correspond to separate applications.

Furthermore, the interface may include means for adjusting the audible volume of a signaling unit and/or means for activating the system, and/or means for testing the system, and/or means for inhibiting at least one set of warning means. For example, an operator may manipulate the inhibition means in order to inhibit visual and/or warning means after having specified the deletion of an obstacle that generated a warning.

The system may also include confirmation means for confirming on the ground the deletion and/or the addition of an obstacle in the onboard database. These confirmation means may be located in the onboard unit.

Thus, the deletion of an obstacle may be deemed to have occurred definitively after confirmation on the ground.

An operator may consult charts in order to make sure of the absence of an obstacle that was deleted during flight. Thus, during flight the pilot signals an obstacle to be deleted, and confirms the deletion on the ground.

Similarly, an operator may confirm on the ground of the presence of a new obstacle, for example, by refining the coordinates of this obstacle.

The system may also include a non-onboard database that can be updated by the onboard database of an onboard unit, and that can update the onboard database of an onboard unit.

This non-onboard database may be the exclusive possession of a user, but will preferentially be shared among a plurality of users in order to make it collaborative and thereby expand its completeness.

The non-onboard database is then shared, by being able to communicate with a plurality of onboard databases that are separate from a plurality of onboard units.

Accordingly, when the system includes a mobile piece of equipment or a mobile calculator, this mobile piece of equipment and this mobile calculator can interface with the non-onboard database, and, for example, with a computer storing this non-onboard database.

The system may also include transfer means for transferring the data from an onboard database to the non-onboard database and vice-versa.

The transfer means to make it possible to identify the obstacles that have been added or deleted during flight, or to process this information with a view toward updating a non-onboard database that may be non-collaborative.

An operator then connects the transfer means to the onboard database, doing so, for example, through the processing unit, in order to enable an update of the non-onboard database.

The transfer means may optionally include a computer and communications means that allow the onboard database and the computer to communicate with each other, along with the non-onboard database and the computer.

The system may also include a wireless connection that makes it possible, during flight or on the ground, to exchange information between the onboard database and the transfer means or the non-onboard database.

Furthermore, an onboard unit may optionally include an onboard obstacle-detection device that communicates with the onboard database in order to update the onboard database.

An onboard unit may optionally be supplemented by an active obstacle-detection device of a known type, such as a device described earlier or an optical device that also performs image analysis. This obstacle-detection device is then advantageously linked to means—which may, for example, consist of the processing unit—for updating the onboard database. The obstacle-detection device may include:
- at least one camera and an associated image-processing device;
- an OWS device that uses a radar device;
- an OWS device that uses a laser or a LIDAR device; or
- any combination of these devices.

This update may take place in real time during flight, in real time by sending the collected information to transfer means located on the ground, or on a deferred basis on the ground, for example, by updating the non-onboard database.

The system may also include several onboard units to be placed in several aircraft and a single non-onboard database.

Furthermore, the system may include several onboard units, with each onboard unit including a communications device for signaling, to another onboard unit, the addition and/or the deletion of an obstacle.

In this variant, the system is also equipped with means for communication between aircraft, for example, a device that operates through the use of radio frequencies. This communication allows an aircraft to transmit to another aircraft the obstacles that have been added or deleted by a crew with the aid of the user interface. The result is an immediate update of the equipment of the surrounding aircraft.

In addition to a system, the invention also relates to an aircraft that includes this system.

The invention also relates to the obstacle-detection procedure that is implemented. According to this procedure:
- at least one onboard unit is installed on board an aircraft, which onboard unit includes an onboard database that stores at least one obstacle to be avoided during flight;
- the manual addition and deletion of obstacles in the onboard database during flight is authorized; and
- the addition and/or the deletion of obstacles in the onboard database is confirmed manually on the ground.

For example, an operator may actuate an addition button in proximity to a new obstacle. The position of the obstacle and the date of the addition may be stored during flight. Accordingly, the obstacle is added temporarily and on an approximate basis, during flight, to the onboard database.

On the ground, an operator may confirm the presence of the obstacle and its coordinates in order to update the onboard database and, if appropriate, the non-onboard database.

Similarly, an operator may actuate a deletion button in proximity to an obstacle deemed to have been improperly signaled. This deletion instruction may be stored during flight in the onboard database, and may, if appropriate, be accompanied by the inhibition of warnings. The position of the non-observed obstacle and the date of the deletion may be stored during flight.

On the ground, an operator may confirm the absence of the obstacle in order to update the onboard database and, if appropriate, the non-onboard database.

BRIEF DESCRIPTION OF THE SEVERAL VIEWS OF THE DRAWINGS

The invention and its advantages will become clear in greater detail within the scope of the following description, which includes illustrative examples with reference to the attached figures, among which.

Elements that appear in two or more different figures are indicated by the same reference number.

DETAILED DESCRIPTION OF THE INVENTION

Figure 1:
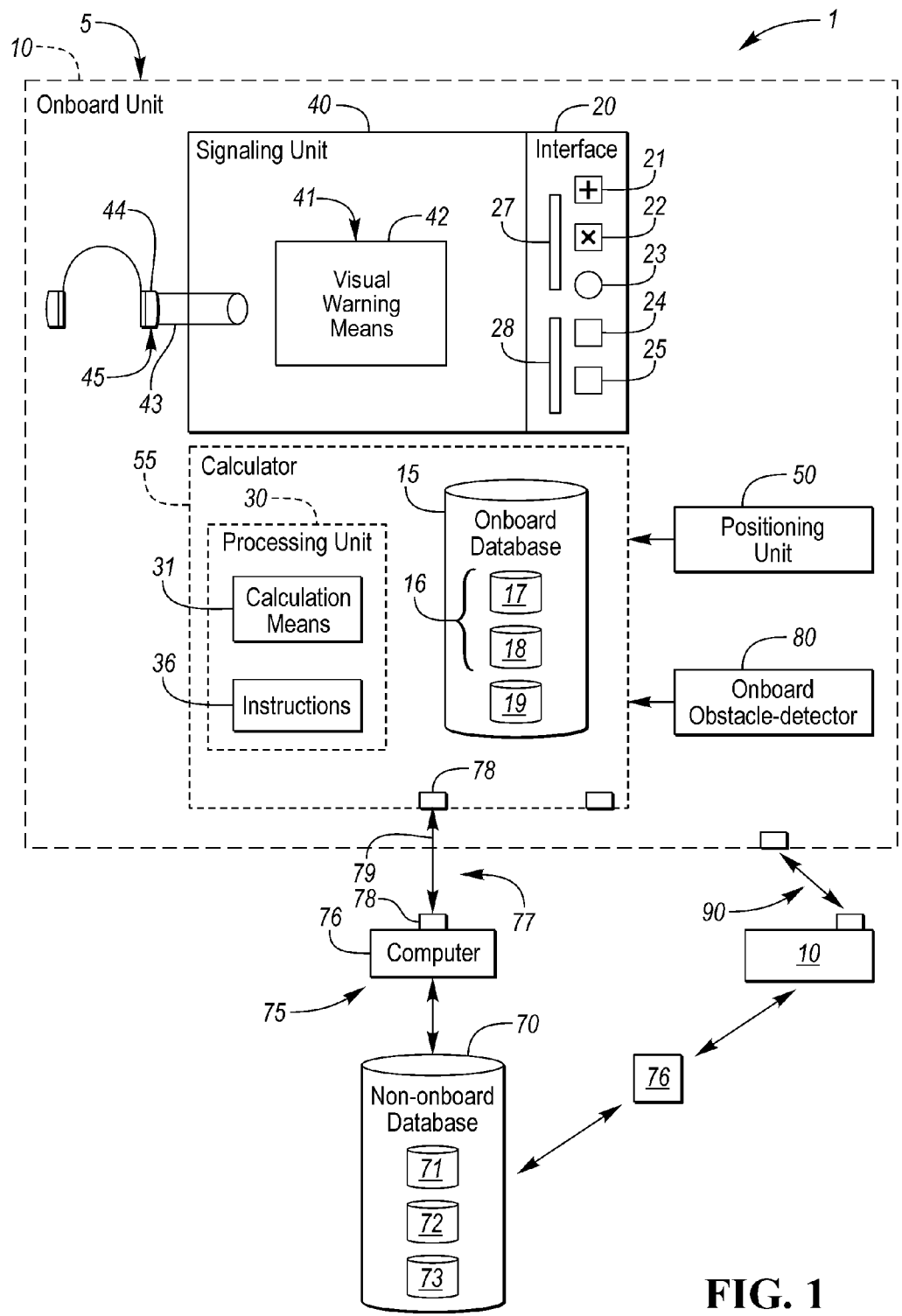
FIG. 1 is a view of a system equipped with a calculator.
Figure 2:
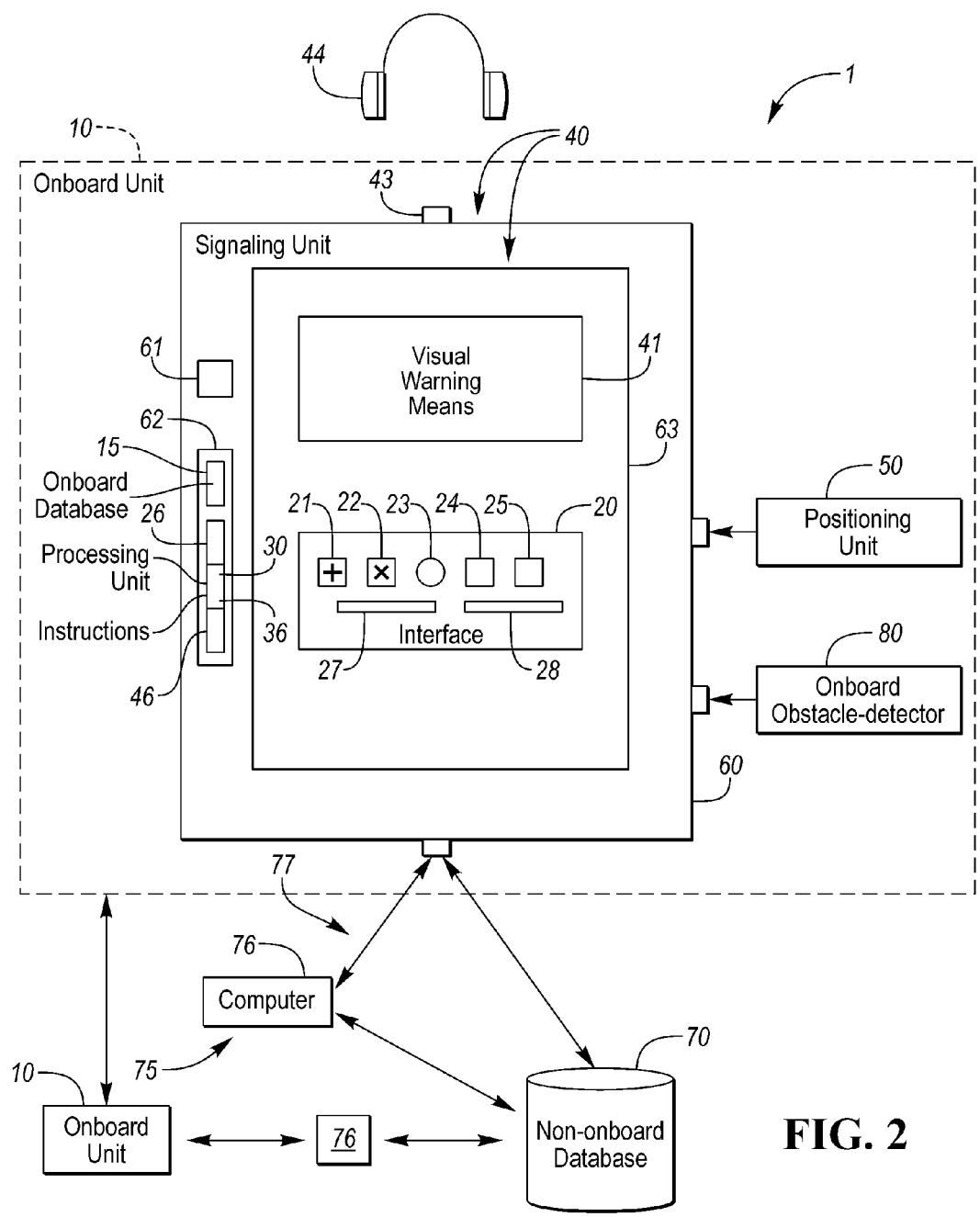
FIG. 2 is a view of a system equipped with a piece of mobile equipment.

FIGS. 1 and 2 show an aircraft 1 equipped with a system 5 according to various embodiments in order to signal the presence of an obstacle. The elements that do not belong to the system are not shown in FIGS. 1 and 2.

Regardless of the embodiment, the system 5 is equipped with an onboard unit 10 to be installed in each aircraft to be equipped. Thus, FIG. 1 shows two aircraft, each of which is equipped with an onboard unit 10, but with only one onboard unit being presented in detail.

Such an onboard unit 10 is provided with a database located in aircraft, which database is in fact designated as "onboard database 15". The onboard database stores at least one obstacle and, if appropriate, the topology of the terrain being overflown.

The onboard unit 10 is also equipped with an interface 20. This interface 20 communicates with the onboard database in order to allow the addition or the deletion of an obstacle in the onboard database 15.

The interface 20 may then include an addition button 21 to add an obstacle to the onboard database 15, and a deletion button 22 to delete an obstacle from the onboard database 15.

In an innovative manner, the invention thus proposes to install, on board an aircraft, a database that can be modified during flight.

For example, the onboard database 15 may include a frozen database 16 that cannot be modified by the interface 20 during flight, and an adaptive database 19 that can be modified by this interface 20. This frozen database 16 includes, for example, a terrain database 17 and/or an obstacle database 18.

The onboard unit 10 is also equipped with a processing unit 30 that provides a link between the onboard database 15 and the interface 20. The processing unit 30 may include calculation means 31 that execute instructions 36 that are stored in non-volatile memory.

This processing unit 30 also communicates with a positioning unit 50. The positioning unit may include a device of the GPS type.

When an operator actuates the addition button 21, the interface sends, to the processing unit 30, an order for the addition of an obstacle. This processing unit 30 queries the positioning unit in order to determine the spatial coordinates of the aircraft, and then stores, in the onboard database 15, a new obstacle associated with these coordinates.

The processing unit 30 is also connected to a signaling unit in order to signal, to an operator, the presence of an obstacle in his visual field. The signaling unit 40 may then include visual warning means 41 and/or audible warning means 45.

Warning means 45 may include an onboard telephone 44 or means 43 that provide a link to such an onboard telephone. These linking means 43 may include a plug and/or a wired link and/or a wireless link to the onboard telephone.

The visual warning means 41 may include a display screen 42. The term "display screen" refers to a screen per se, or a portion of the screen, for example, or even, for example, a visual indicator consisting of light-emitting diodes (LEDs).

Comfortably, the processing unit determines whether at least one of the obstacles stored in the onboard database is present, for example, in the visual field of the pilot. If so, the processing unit causes the signaling unit 40 to signal the most dangerous obstacle to a pilot. The most dangerous obstacle may be the obstacle that is closest to the aircraft.

If the pilot does not locate and identify this obstacle visually, then the signaled obstacle may no longer be physically present. An operator, and, in particular, the pilot, may then actuate the deletion button in order to cause the deletion of the obstacle from the onboard database.

The interface may also include other buttons.

Accordingly, the interface 20 may include means 23 for adjusting the audible volume of an audible warning issued by the signaling unit 40, and/or means 24 for activating the system, and/or means 25 for testing the system. These means issue an order, for example, to the processing unit, with this processing unit, if appropriate, communicating with the signaling unit.

Furthermore, the interface may include inhibition means 27 for inhibiting at least one of the sets of warning means 41, 45. These inhibition means may include an inhibition button that can be actuated by an operator.

When an operator actuates the inhibition means 27, the interface sends an order to the processing unit 30 in order to inhibit the warning means.

Then, if a pilot does not visually locate and identify an obstacle, an operator may then actuate the deletion button in order to cause the deletion of the obstacle from the onboard database. Furthermore, if a warning was triggered, the operator may actuate the inhibition button in order to inhibit the warning means.

According to a variant, the deletion button and the inhibition button are merged or combined in a single button.

The system may also include confirmation means 28 for confirming, on the ground, the deletion and/or the addition of an obstacle in the onboard database 15.

These confirmation means may include at least one element or component—for example, that which is incorporated into the interface 20—that can be actuated by a pilot.

In accordance with the example shown, the system 5 also includes a non-onboard database 70 that can be updated by the onboard database 15 of an onboard unit 10, and that can update the onboard database 15 of an onboard unit 10.

Consequently, the non-onboard database 70 and the onboard database 15 can communicate with each other in order to agree with each other.

The non-onboard database 70 and the onboard database 15 advantageously have identical structures. Accordingly, the non-onboard database 70 and the onboard database 15 may both include a frozen terrain database 71 and 17, a frozen obstacle database 72 and 18, and an adaptive obstacle database 73 and 19, respectively.

An operator may select the direction in which information is transferred, namely, from the onboard database 15 to a non-onboard database 70, or from the non-onboard database 70 to an onboard database 15.

Accordingly, the system may also be equipped with transfer means 75 for transferring the data from an onboard database 15 to the non-onboard database 70 and vice-versa. These transfer means 75 include, for example, a computer 76 and communication means 77 that allow the onboard database 15 and the computer 76 to communicate with each other.

The computer is then connected to an onboard unit, for example, by plugs 78 and wired connections 79, and/or via wireless connections, in order to download the information from the onboard database.

This computer may also store the non-onboard database in its memory, and may update the databases.

However, the non-onboard database may be hosted on a server that can communicate with the transfer means.

Accordingly, the non-onboard database 70 is advantageously shared by different aircraft, by being able to communicate with a plurality of onboard databases 15 that are separate from a plurality of onboard units 10.

Consequently, the system 5, for example, equipped with an onboard unit 10 is detected by aircraft equipped with the invention, and with a single non-onboard database 70.

Furthermore, each onboard unit 10 may optionally be equipped with a communications device 90 for signaling, during flight, the addition and/or the deletion of an obstacle to another onboard unit 10. This communications device may consist of standard wireless data-transfer means, operating, for example, by means of radio frequencies.

Furthermore, an onboard unit 10 may have an onboard obstacle-detection device 80 that communicates with the onboard database 15 in order to update this onboard database 15.

According to the embodiment shown in FIG. 1, an onboard unit 10 includes a calculator 55 that contains, in a single body, the processing unit 30 and the onboard database 15.

The processing unit 30 may include calculation means in the calculator and instructions stored in storage means in the calculator. Similarly, the onboard database 15 is stored in the storage means.

The processing unit communicates with the onboard database when the calculation means gain access to the data in the onboard database in order to use or modify the data.

This calculator 55 includes standard communications means for communicating with the interface 20, the signaling unit 40, and the positioning means 50. Such communications means may include plugs, wired connections, and/or wireless connections.

The calculator may be a component that is dedicated to this application, or a non-dedicated component. Furthermore, the calculator may be permanently installed on board the aircraft or may be mobile.

The calculator of an onboard unit may, if appropriate, include a wireless communications device for communicating with another onboard unit, and/or means for communicating with an obstacle-detection device.

The calculator 55 is also connected to the positioning means 50, to the interface 20, and to the signaling means 40.

Furthermore, the interface 20 and the positioning means may be at least partially merged or combined within a single piece of interface equipment.

According to the embodiment shown in FIG. 2, an onboard unit 10 includes a piece of mobile equipment 60 that contains, in a single body, the processing unit 30, as well as the onboard database 15, the interface 20, and the signaling unit 40.

This mobile equipment may be a tablet or an equivalent device, equipped with calculation means 61, a storage component 62, and a screen 63. The piece of mobile equipment 60 is connected, in particular, to the positioning means 50, or else the piece of mobile equipment is equipped with its own positioning means.

Accordingly, the processing unit is implemented by the calculation means 61 and an instruction segment 36 of the storage means.

Similarly, the interface unit 20 is implemented by the calculation means 61 and an instruction segment 26 of the storage means. The calculation means 61 execute this instruction segment 26 in order to display a representation of the various interface buttons on the screen 63.

The signaling unit 40 is implemented by the calculation means 61, an instruction segment 46 of the storage means, a window displayed on the screen 63, and connection means 43 leading to an onboard telephone 44.

Finally, the onboard database is stored in the storage means.

If a user actuates the addition button on the interface (for example, with the aid of a pointer controlled by a finger moving on the screen), the calculation means 61 communicate with the positioning means via a standard link.

The calculation means 61 communicate with the onboard database, doing so through the storage means.

If an obstacle is present in the visual field of the pilot, the calculation means of the processing unit execute the instructions in the instruction segment 46 of the signaling unit 40, in order to trigger a warning.

The mobile equipment of an onboard unit may, if appropriate, include a wireless communications device for communicating with another onboard unit, and/or means for communicating with an obstacle-detection device.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A system for being installed in an aircraft in order to signal a presence of an obstacle during visual flight of the aircraft, the system comprising:
   at least one onboard unit for being installed on board the aircraft, which onboard unit includes an onboard database for being installed on board the aircraft, which onboard database stores at least one obstacle to be avoided during flight, with an obstacle consisting of an object located on a surface of a planet that is not identified as being a part of the planet surface,
   wherein the onboard unit further includes a processing unit communicating with the onboard database and a positioning unit communicating with the processing unit, the positioning unit having a function of determining a position in space of the aircraft,
   wherein the onboard unit further includes a manual interface for being installed on board the aircraft and whose function is to authorize manual addition and deletion of obstacles, visually detected by an operator on board the aircraft, to and from the onboard database by the operator on board the aircraft during flight of the aircraft, with the interface being in communication directly with the onboard database, the onboard database storing with an obstacle added to or deleted from the onboard database via the interface the position in space of the aircraft from the positioning unit at the time the obstacle is added to or deleted from the onboard database, and with the system further including confirmation means for confirming with an operator on the ground while the aircraft is on the ground after flight that an obstacle deleted from the onboard database via the interface is absent from a location of the planet surface corresponding to the position in space of the aircraft at the time the obstacle was deleted from the onboard database and that an obstacle added to the onboard database via the interface is present at a location of the planet surface corresponding to the position in space of the aircraft at the time the obstacle was added to the onboard database.

2. The system according to claim 1, wherein the onboard database includes a frozen database that cannot be modified by the interface during flight of the aircraft and an adaptive database that can be modified by the interface during flight of the aircraft.

3. The system according to claim 2, wherein the frozen database includes a terrain database or an obstacle database.

4. The system according to claim 1, wherein the onboard unit further includes a signaling unit communicating with the processing unit, with the signaling unit having a function of signaling an obstacle when the processing unit determines proximity to the aircraft of an obstacle listed in the onboard database.

5. The system according to claim 4, wherein the signaling unit includes visual warning means or audible warning means.

6. The system according to claim 5, wherein the audible warning means include an onboard telephone.

7. The system according to claim 5, wherein the visual warning means include a display screen.

8. The system according to claim 4, wherein the onboard unit includes a calculator, which calculator includes, in a single body, the processing unit and the onboard database, with the calculator being connected to the positioning unit, the interface, and the signaling unit.

9. The system according to claim 1, wherein the onboard unit includes, in a single body, the processing unit, the onboard database, and the interface.

10. The system according to claim 1, wherein the onboard unit includes an onboard obstacle-detection device that is in communication with the onboard database in order to update the onboard database.

11. The system according to claim 1, wherein the system includes a non-onboard database that communicates with the onboard database in order to be updated by the onboard database and in order to update the onboard database.

12. The system according to claim 11, wherein the system includes transfer means for transferring data between the onboard database and the non-onboard database.

13. The system according to claim 12, wherein the transfer means include a computer and communication means that place the onboard database and the computer in communication with each other.

14. The system according to claim 11, wherein the non-onboard database is shared, by being able to communicate with a plurality of onboard databases that are separate from a plurality of onboard units.

15. The system according claim 11, wherein the system includes several onboard units to be placed in several aircraft and a single non-onboard database.

16. The system according to claim 1, wherein the onboard unit further includes a signaling unit communicating with the processing unit, with the signaling unit having a function of signaling an obstacle listed in the onboard database to the operator when the processing unit determines proximity to the aircraft of the obstacle; and
 wherein the manual interface authorizes manual deletion of the obstacle from the onboard database by the operator in response to the operator visually detecting an absence of the obstacle after the signaling unit signaled the obstacle to the operator.

17. The system according to claim 1, wherein the system includes several onboard units, with each onboard unit including a communications device to signal addition or deletion of an obstacle to another onboard unit.

18. An aircraft comprising:
 an onboard database of an onboard unit installed on board the aircraft, the onboard database stores at least one obstacle to be avoided during flight, with an obstacle consisting of an object located on a surface of a planet that is not identified as being a part of the planet surface;
 a processing unit communicating with the onboard database, a communications unit communicating with the processing unit, and a positioning unit communicating with the processing unit, the positioning unit having a function of determining a position in space of the aircraft;
 a manual interface of the onboard unit whose function is to authorize manual addition and deletion of obstacles, visually detected by an operator on board the aircraft, to and from the onboard database by the operator on board the aircraft during flight of the aircraft, with the interface being in communication directly with the onboard database, the onboard database storing with an obstacle added to or deleted from the onboard database via the interface the position in space of the aircraft from the positioning unit at the time the obstacle is added to or deleted from the onboard database; and
 wherein the onboard database is in communication via the communication unit with an operator on the ground to confirm with the operator on the ground while the aircraft is on the ground after flight that an obstacle deleted from the onboard database via the interface is absent from a location of the planet surface corresponding to the position in space of the aircraft at the time the obstacle was deleted from the onboard database and that an obstacle added to the onboard database via the interface is present at a location of the planet surface corresponding to the position in space of the aircraft at the time the obstacle was added to the onboard database.

19. The aircraft of claim 18 further comprising:
 a signaling unit communicating with the processing unit, wherein the signaling unit signals an obstacle listed in the onboard database to the operator when the processing unit determines proximity to the aircraft of the obstacle; and
 wherein the manual interface authorizes manual deletion of the obstacle from the onboard database by the operator in response to the operator visually detecting an absence of the obstacle after the signaling unit signaled the obstacle to the operator.

20. A method for an aircraft in order to signal a presence of an obstacle during visual flight of the aircraft, the method comprising:
 storing in an onboard database of an onboard unit installed on board the aircraft at least one obstacle to be avoided during flight with an obstacle consisting of an object located on a surface of a planet that is not identified as being a part of the planet surface;
 determining a positioning in space of the aircraft while the aircraft is in flight by a positioning unit on board the aircraft;
 authorizing, by a manual interface of the onboard unit, in communication directly with the onboard database, manual addition and deletion of obstacles, visually detected by an operator on board the aircraft, to and from the onboard database by the operator on board the aircraft during flight of the aircraft;
 storing in the onboard database with an obstacle added to or deleted from the onboard database via the interface a position in space of the aircraft from the positioning unit at the time the obstacle is added to or deleted from the onboard database; and
 confirming with an operator on the ground while the aircraft is on the ground after flight that an obstacle deleted from the onboard database via the interface is absent from a location of the planet surface corresponding to the position in space of the aircraft at the time the obstacle was deleted from the onboard database and that an obstacle added to the onboard database via the interface is present at a location of the planet surface corresponding to the position in space of the aircraft at the time the obstacle was added to the onboard database.

21. The method of claim 20 further comprising:
 signaling an obstacle listed in the onboard database to the operator upon the aircraft being in a proximity to the obstacle; and
 authorizing by the manual interface manual deletion of the obstacle from the onboard database by the operator in response to the operator visually detecting an absence of the obstacle after being signaled of the obstacle.

* * * * *